United States Patent
Enomoto et al.

(10) Patent No.: US 10,133,917 B2
(45) Date of Patent: Nov. 20, 2018

(54) LIFELOG RECORDING SYSTEM

(71) Applicant: TOYOTA JIDOSHA KABUSHIKI KAISHA, Toyota-shi, Aichi-ken (JP)

(72) Inventors: Takaaki Enomoto, Anjo (JP); Satoshi Nakagawa, Okazaki (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 219 days.

(21) Appl. No.: 15/145,381

(22) Filed: May 3, 2016

(65) Prior Publication Data

US 2017/0083757 A1    Mar. 23, 2017

(30) Foreign Application Priority Data

Sep. 17, 2015   (JP) ................................ 2015-184246

(51) Int. Cl.
G06K 9/00 (2006.01)
G06F 3/01 (2006.01)
G08G 1/01 (2006.01)

(52) U.S. Cl.
CPC .......... G06K 9/00302 (2013.01); G06F 3/011 (2013.01); G06F 3/015 (2013.01); G06K 9/00315 (2013.01); G06K 9/00845 (2013.01); G08G 1/0112 (2013.01)

(58) Field of Classification Search
CPC ........... G06K 9/00335; G06K 9/00302; G06K 9/00355; G06F 3/011; G08G 1/0112
See application file for complete search history.

(56) References Cited

U.S. PATENT DOCUMENTS

| | | | |
|---|---|---|---|
| 8,872,640 B2 * | 10/2014 | Horseman | B60W 40/08 340/425.5 |
| 2002/0015582 A1 * | 2/2002 | Matsumoto | H04N 5/76 386/295 |
| 2011/0172873 A1 * | 7/2011 | Szwabowski | B60K 37/06 701/29.5 |
| 2013/0012790 A1 * | 1/2013 | Horseman | G06F 19/3418 600/301 |
| 2014/0195467 A1 | 7/2014 | Yoshizu | |
| 2014/0236967 A1 | 8/2014 | Kawano et al. | |
| 2017/0000397 A1 * | 1/2017 | Mitsuyoshi | A61B 5/72 |
| 2017/0188977 A1 * | 7/2017 | Sato | A61B 5/024 |
| 2017/0303842 A1 * | 10/2017 | Yoshida | A61B 5/0476 |

FOREIGN PATENT DOCUMENTS

| | | |
|---|---|---|
| JP | 2009049951 A | 3/2009 |
| JP | 2011028436 A | 2/2011 |
| JP | 2014-7532 A | 1/2014 |
| WO | 2013030942 A1 | 3/2013 |
| WO | 2013047436 A1 | 4/2013 |

\* cited by examiner

*Primary Examiner* — Tsion B Owens
(74) *Attorney, Agent, or Firm* — Sughrue Mion, PLLC

(57) ABSTRACT

A data-to-be-recorded generating section generates a piece of data-to-be-recorded by associating an emotion level of a user estimated through an emotion level estimating section with a piece of lifelog data obtained through a lifelog data obtaining section. A log managing section manages whether the piece of data-to-be-recorded should be stored in a memory device based on a selectivity based on the emotion level.

5 Claims, 5 Drawing Sheets

Fig.2

| Detecting method | Probability of Type of Emotion | | | |
|---|---|---|---|---|
| | Delight | Anger | Sorrow | Pleasure |
| Facial Expression | Face (Delight) | Face (Anger) | Face (Sorrow) | Face (Pleasure) |
| Motion | Motion (Delight) | Motion (Anger) | Motion (Sorrow) | Motion (Pleasure) |
| Biometric Signals | Biometrics (Delight) | Biometrics (Anger) | Biometrics (Sorrow) | Biometrics (Pleasure) |
| Evaluation Value | Face (Delight) × Reliability $\alpha$ + Motion (Delight) × Reliability $\beta$ + Biometrics (Delight) × Reliability $\gamma$ = Evaluation Value (Delight) | Face (Anger) × Reliability $\alpha$ + Motion (Anger) × Reliability $\beta$ + Biometrics (Anger) × Reliability $\gamma$ = Evaluation Value (Anger) (Greatest Value) | Face (Sorrow) × Reliability $\alpha$ + Motion (Sorrow) × Reliability $\beta$ + Biometrics (Sorrow) × Reliability $\gamma$ = Evaluation Value (Sorrow) | Face (Pleasure) × Reliability $\alpha$ + Motion (Pleasure) × Reliability $\beta$ + Biometrics (Pleasure) × Reliability $\gamma$ = Evaluation Value (Pleasure) |

Estimate type of emotion as Anger

Fig.3

| Lifelog data | | | Emotion | |
|---|---|---|---|---|
| Recorded Time | Vehicle Position Coordinates | Title of piece of music played | Type of Emotion | Emotion Level |
| T1 | (Xa1, Ya1) | Title A | Anger | 2 |
| T2 | (Xa2, Ya2) | Title A | Sorrow | 1 |
| ⋮ | ⋮ | ⋮ | ⋮ | ⋮ |
| T101 | (Xa101, Ya101) | Title B | Pleasure | 4 |
| T102 | (Xa102, Ya102) | Title B | Delight | 5 |
| ⋮ | ⋮ | ⋮ | ⋮ | ⋮ |

(T1, T2 rows: Discard data; T101, T102 rows: Record data)

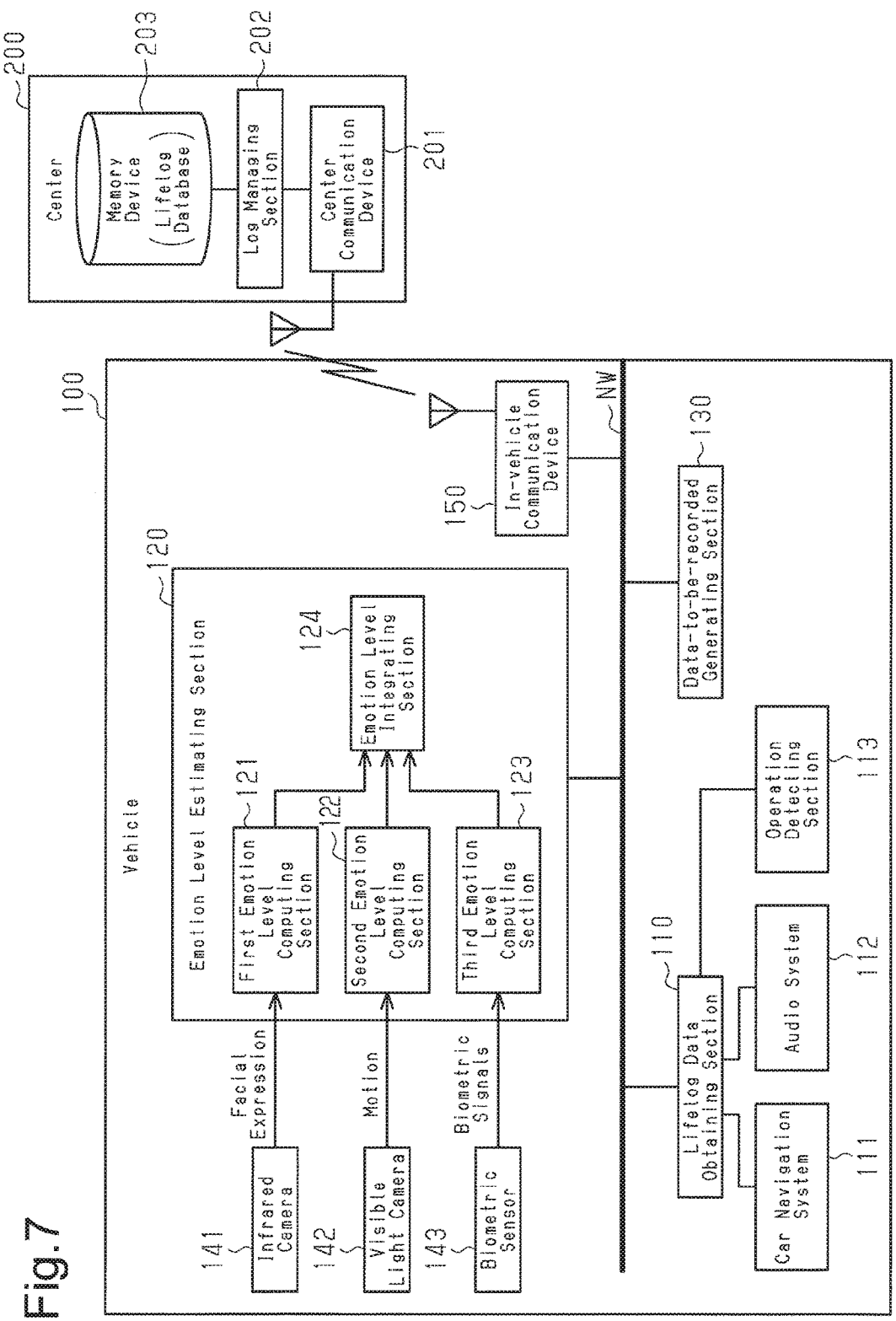

LIFELOG RECORDING SYSTEM

BACKGROUND OF THE DISCLOSURE

The present disclosure relates to a lifelog recording system that records, as lifelog data, life information of the user such as action information and biometric information.

For example, Japanese Laid-Open Patent Publication No. 2014-7532 discloses a portable terminal device that allows information regarding motions and locations to be recorded as lifelog data together with the time through a simple operation of pressing a lifelog button, which is a type of operation button.

SUMMARY

Even in the case of the device disclosed in Japanese Laid-Open Patent Publication No. 2014-7532, in which lifelog data is recorded using operation of the lifelog button as a trigger, the user generally feels varied degrees of usefulness of lifelog data in each moment.

Thus, recording and preserving all the data indiscriminately without taking into consideration the degree of usefulness are not desirable in view of management of the available space in a memory device.

It is an objective of the present disclosure to provide a lifelog recording system that efficiently manages the available space of a memory device such that highly useful pieces of lifelog data are preferentially preserved in the memory device.

In accordance with one aspect of the present disclosure, a lifelog recording system that records, as a piece of lifelog data, life information of a user is provided. The system includes a lifelog data obtaining section, an emotion level estimating section, a memory device, a data-to-be-recorded generating section, and a log managing section. The lifelog data obtaining section is configured to obtain the piece of lifelog data from an action of the user. The emotion level estimating section is configured to estimate an emotion level, which is a quantified emotion state of the user, based on at least one of a result of monitoring the action by the user and a biometric signal obtained by a biometric sensor. The memory device is configured to store the piece of lifelog data. The data-to-be-recorded generating section is configured to generate a piece of data-to-be-recorded by associating the emotion level of the user, which is estimated through the emotion level estimating section, with the piece of lifelog data, which is obtained through the lifelog data obtaining section. The log managing section is configured to manage whether the piece of data-to-be-recorded should be stored in the memory device based on a selectivity based on the associated emotion level.

The usefulness of each piece of lifelog data varies depending on the emotion level of the user at the time of obtaining the data. For example, when using lifelog data highly relevant to specific types of emotion such as delight, anger, sorrow and pleasure, pieces of lifelog data having relatively high emotion levels tend to have a relatively high usefulness. In contrast, when using lifelog data of a steady state of the user unaffected by the emotion level, pieces of lifelog data having low emotion levels tend to have a relatively high usefulness.

Accordingly, the above described configuration manages whether a piece of data-to-be-recorded should be stored in the memory device based on the selectivity in accordance with the emotion level related to the lifelog data. This allows highly useful pieces of lifelog data to be preferentially preserved in the memory device, so that the available space of the memory device is efficiently managed.

In one form of the lifelog recording system, the log managing section is configured to selectively record, in the memory device, the piece of data-to-be-recorded that has the emotion level in a recording range.

In the above described configuration, the following method is employed to manage whether a piece of data-to-be-recorded should be stored in the memory device. That is, for example, pieces of data-to-be-recorded of which the emotion levels are in a desired recording range, such as a piece of data of a relatively high emotion level or a piece of data of a relatively low emotion level, are selectively stored in the storage device. This allows highly useful pieces of lifelog data to be automatically and preferentially preserved in the memory device.

In one form of the lifelog recording system, when an available space of the memory device is smaller than a predetermined value, the log managing section is configured to delete, from the memory device, a piece of data-to-be-recorded that has the emotion level in a deletion range.

With the above configuration, when the available space of the memory device is small, pieces of lifelog data of low usefulness are deleted preferentially. This facilitates the management of the available space of the memory device. This management method may be combined with the above described selective recording method. Alternatively, the deleting method may be used independently. When the deleting method is used independently, the range of the emotion levels to be deleted may be out of the recording range. On the other hand, if the deleting method and the selective recording method are combined, the data-to-be-recorded and data-to-be-deleted are determined such that a part of the recording range partly overlaps the deletion range. For example, in a case in which the emotion levels are classified into level 1 to level 5, if the recording range is level 4 or higher and the deletion range is lower than level 5, level 4, which is part of the recording range, is in the deletion range.

In one form of the lifelog recording system, when there are two or more pieces of data-to-be-recorded that are candidates to be deleted, the log managing section is configured to delete the pieces of data preferentially from the piece of data of which the recorded time older.

With this configuration, it is possible to preserve pieces of data that are more closely related to the present condition than in a case in which pieces of data-to-be-recorded are deleted indiscriminately based on the emotion level related to the data-to-be-recorded. This permits detailed management of the log data.

In one form of the lifelog recording system, the user is a driver of a vehicle, and the lifelog data obtaining section is configured to obtain, as the piece of lifelog data, a vehicle operating action by the driver during traveling of the vehicle. The vehicle operating action includes at least one of an operation of an in-vehicle device and an operation related to traveling of the vehicle, and the emotion level estimating section is configured to estimate the emotion level of the driver during traveling of the vehicle.

With this configuration, the emotion level is associated with the life log data of the driver in accordance with the driver's emotion level during traveling of the vehicle. For example, the piece of music that is being played may be obtained in connection with the traveling position of the vehicle, and the emotion level at the time may be assumed to be a relatively high emotion level among a number of types of emotions, such as "pleasant (happy)." When the vehicle travels through the same traveling position, the same piece of music will be played automatically. Therefore, it is possible to preserve, in the memory device, lifelog data that is useful for providing timely service in accordance with the emotion of the driver of the vehicle.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which:

FIG. 2 is an explanatory diagram showing a method by which the emotion level estimating section shown in FIG. 1 estimates the emotion of the driver;

FIG. 3 is a schematic diagram showing one example of time-series data of pieces of data-to-be-recorded that are generated by the lifelog recording system shown in FIG. 1 by associating, to the lifelog data of the vehicle driver, the driver's emotion when the lifelog data is obtained;

FIG. 7 is a block diagram illustrating a lifelog recording system according to another modification.

DESCRIPTION OF THE PREFERRED EMBODIMENTS

A lifelog recording system according to the present embodiment records, as lifelog data, the vehicle operating actions by the driver during traveling of the vehicle. The system records lifelog data and estimates the driver's emotion level. The system also records, as data-to-be-recorded, the estimated emotion level by associating the estimated emotion level with the lifelog data. The usefulness of each piece of lifelog data varies depending on the driver's emotion level at the time of obtaining the piece of data. For example, the piece of music that is being played may be obtained in connection with the traveling position of the vehicle, and the emotion level at the time may be assumed to be a relatively high emotion level among a number of types of emotions, such as "pleasant (happy)." In this case, when the vehicle travels through the same traveling position, the same piece of music will be played automatically. When using lifelog data highly relevant to specific types of emotion such as delight, anger, sorrow and pleasure, pieces of lifelog data having relatively high emotion levels tend to have a relatively high usefulness. In the present embodiment, a center, which manages traveling information of a plurality of vehicles, includes a memory device, which functions as a lifelog database. That is, on the assumption that the lifelog data will be used, a memory device installed in the center records pieces of data-to-be-recorded on condition that an emotion level associated with the pieces of lifelog data is higher than or equal to a predetermined level. That is, the center is configured to unify the management of the lifelog data of a plurality of drivers.

First, the structure of the system according to the present embodiment will be described with reference to the drawings.

Figure 1:
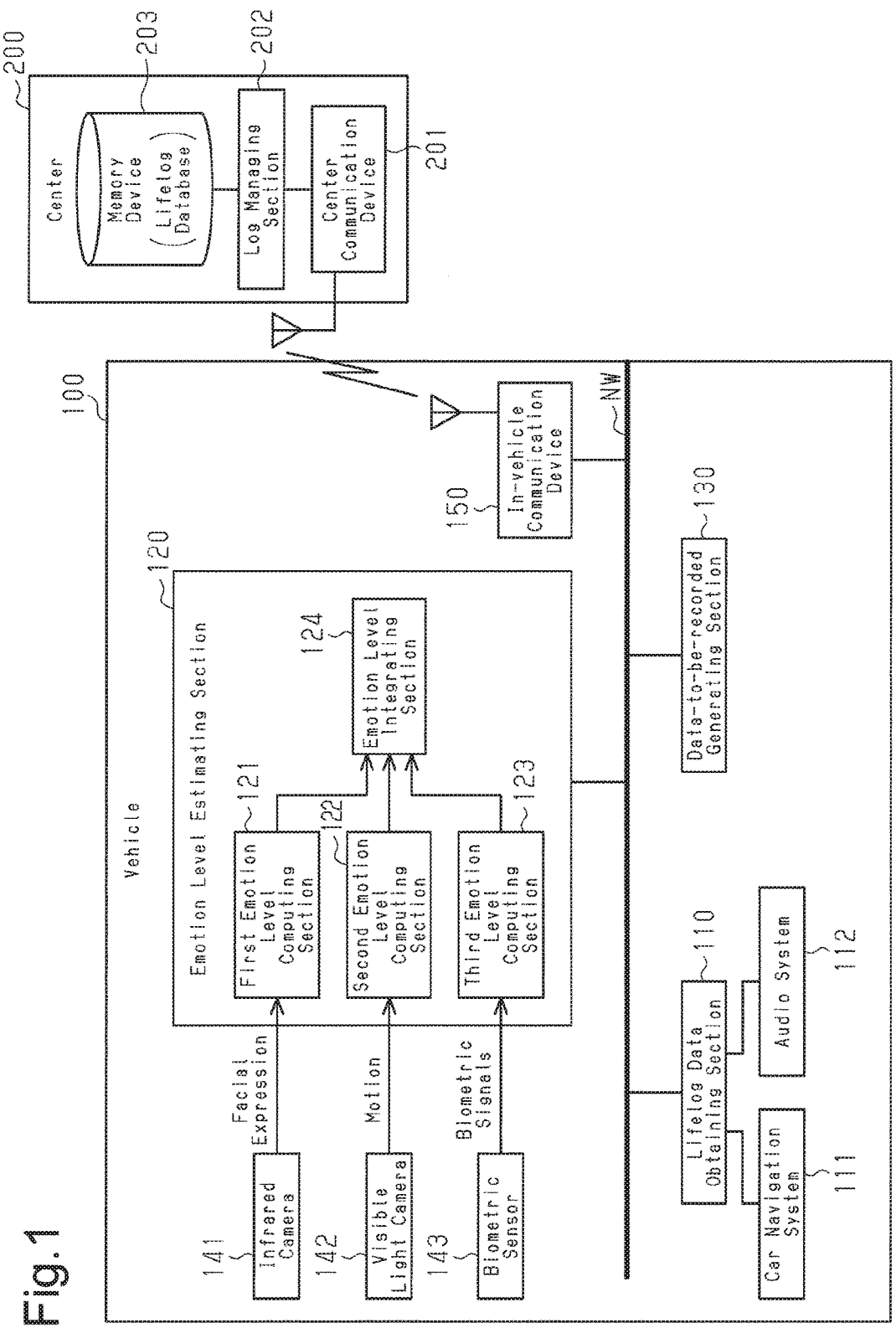
FIG. 1 is a block diagram schematically showing a lifelog recording system according to one embodiment of the present disclosure.

As shown in FIG. 1, a vehicle 100 has a plurality of electronic control units, which are connected to each other, for example, via a controller area network (CAN). The electronic control units include a lifelog data obtaining section 110, which obtains lifelog data of the driver during traveling of the vehicle 100, and an emotion level estimating section 120, which estimates the driver's emotion level during traveling of the vehicle 100. The electronic control units further include a data-to-be-recorded generating section 130, which generates data-to-be-recorded by associating the driver's emotion level obtained through the emotion level estimating section 120 with the lifelog data obtained through the lifelog data obtaining section 110. These electronic control units can be constituted by various kinds of electric circuits and microcomputers.

The lifelog data obtaining section 110 periodically obtains, as lifelog data, the traveling position of the vehicle 100 at each moment and vehicle operating actions by the driver during traveling of the vehicle 100, such as the title of the piece of music being played in the passenger compartment. The lifelog data obtaining section 110 obtains information related to the traveling position of the vehicle 100 at each moment, for example, through a global positioning system (GPS) in a car navigation system 111, which guides routes of the vehicle 100. Also, the lifelog data obtaining section 110 obtains information related to the title of the piece of music being played in the passenger compartment via an audio system 112, which plays music in the passenger compartment. The thus obtained lifelog data of the driver is periodically delivered to the data-to-be-recorded generating section 130 from the lifelog data obtaining section 110 via the vehicle network NW.

On the other hand, the emotion level estimating section 120 is connected to an infrared camera 141, which is a camera for shooting the face of the driver in the passenger compartment. The infrared camera 141 obtains feature quantities of the facial expression of the driver such as movements of the point of gaze of the driver, which are used to evaluate the facial expression of the driver. The feature quantities of the facial expression shot by the infrared camera 141 are delivered to the emotion level estimating section 120. The obtained feature quantities are used in computation of the driver's emotion level performed by a first emotion level computing section 121 in the emotion level estimating section 120.

The emotion level estimating section 120 is also connected to a visible light camera 142, which is a camera for shooting the upper body of the driver in the passenger compartment. The visible light camera 142 obtains feature quantities of motions of the driver such as gestures and vehicle operating motions. The obtained feature quantities are used to evaluate the motions of the driver. The feature quantities of the motions shot by the visible light camera 142 are delivered to the emotion level estimating section 120 and used in computation of the driver's emotion level performed by a second emotion level computing section 122 in the emotion level estimating section 120.

Further, the emotion level estimating section 120 is connected to a biometric sensor 143, which is used to detect biometric signals such as heart rates, pulses, and blood pressures. The biometric signals detected by the biometric sensor 143 are delivered to the emotion level estimating section 120 and used in computation of the driver's emotion level performed by a third emotion level computing section 123 in the emotion level estimating section 120.

In the computations of the driver's emotion performed by the emotion level computing sections 121 to 123, criteria for identifying the driver's emotion are defined through statistical processing on training data previously classified into predetermined types of emotions such as "delight," "anger," "sorrow," and "pleasure." When receiving, as pieces of unknown data, a feature quantity of a facial expression, a feature quantity of a motion, and biometric signals, the emotion level computing sections 121 to 123 compute the probability of each piece of the data corresponding to which type of emotions, based on the predetermined criteria. The emotion level estimating section 120 uses an emotion level integrating section 124 to compute, in an integrated manner, the probability of the type of emotion computed for each type of data (the facial expression, the motion, the biometric signals), thereby estimating the type and level of the driver's emotion. The emotion level refers to a hierarchized degree of the driver's emotion. In the present embodiment, the emotion level is hierarchized in five grades from level 1 to level 5 in ascending order of the strength of emotion.

Specifically, as in the example shown in FIG. 2, the first emotion level computing section 121 computes, based on the feature quantity of a facial expression, the probability by which the type of the emotion corresponds to each of "delight," "anger," "sorrow," and "pleasure" as "face (delight)," "face (anger)," "face (sorrow)," and "face (pleasure)." The second emotion level computing section 122 computes, based on the feature quantity of a motion, the probability by which the type of the emotion corresponds to each of "delight," "anger," "sorrow," and "pleasure" as "motion (delight)," "motion (anger)," "motion (sorrow)," and "motion (pleasure)." The third emotion level computing section 123 computes, based on the feature quantity of biometrics signals, the probability by which the type of the emotion corresponds to each of "delight," "anger," "sorrow," and "pleasure" as "biometrics (delight)," "biometrics (anger)," "biometrics (sorrow)," and "biometrics (pleasure)."

The emotion level integrating section 124 adds up the probabilities of the emotion computed by the emotion level computing sections 121 to 123 to compute an evaluation value used in assuming the driver's emotion level. When computing the evaluation value, each type of data (facial expression, motion, biometric signals), which is used as a basis, is weighted. That is, "reliability α" is a weighting coefficient for the probability based on the feature quantity of the facial expression and is an index value of the reliability of the probability data based on the feature quantity of the facial expression. The "reliability α" is, for example, set to have a smaller value when the face of the driver is covered with a mask or glasses in the image shot by the infrared camera 141 or when the pixel signals include whiteout due to direct sunlight. "Reliability β" is used as a weighting coefficient by which the probability based on the feature quantity of a motion is multiplied, and is an index value of the reliability of the probability data based on the feature quantity of the motion. "Reliability β" is, for example, set to have a smaller value when the upper body of the driver is partly hidden by the steering wheel in the image shot by the visible light camera 142 or when the pixel signals include whiteout due to direct sunlight. "Reliability γ" is a weighting coefficient for the probability based on biometric signals, and is an index value of the reliability of the probability data based on the biometric signals. The reliability γ is, for example, defined as a fixed value based on the detection accuracy of the biometric sensor 143. Among "delight," "anger," "sorrow," and "pleasure," the emotion level integrating section 124 estimates the one with the highest evaluation value as the driver's emotion. In the example shown in FIG. 2, the evaluation value corresponding to "anger" has the greatest value. At this time, the type of the driver's emotion is estimated to correspond to "anger." The emotion level integrating section 124 evaluates the evaluation value computed in the above described manner to estimate the driver's emotion level at the time. The results of estimation of the type and level of the driver's emotion are periodically delivered to the data-to-be-recorded generating section 130 from the emotion level estimating section 120 via the vehicle network NW.

The data-to-be-recorded generating section 130 generates data-to-be-recorded by associating the estimation result of the driver's emotion level obtained from the emotion level estimating section 120 with the lifelog data of the driver obtained from the lifelog data obtaining section 110. The data-to-be-recorded generating section 130 transfers the thus generated data-to-be-recorded to a center 200 from the vehicle 100 via an in-vehicle communication device 150 connected to the vehicle network NW.

The center 200 manages traveling information of a plurality of vehicles 100. The center 200 includes a center communication device 201, which receives various types of information from the vehicles 100 through wireless communication. When receiving a piece of data-to-be-recorded, in which the driver's emotion level and the lifelog data are associated with each other, from any of the vehicles 100, the center communication device 201 delivers the received piece of data-to-be-recorded to a log managing section 202.

When receiving the piece of data-to-be-recorded from the center communication device 201, the log managing section 202 records the received piece of data-to-be-recorded into a lifelog database, which is a memory device 203, on condition that the driver's emotion level associated with the received piece of data-to-be-recorded is in a recording range (in the present embodiment, at level 4 or higher), that is, on condition that the driver's emotion level is 4 or 5. In contrast, when the estimation result of the driver's emotion level in the received piece of data-to-be-recorded is not in the recording range, that is, when the driver's emotion level is in the range from 1 to 3, the log managing section 202 discards the piece of data-to-be-recorded without recording it. That is, in the present embodiment, pieces of lifelog data highly relevant to specific emotions such as delight, anger, sorrow and pleasure, are used. In this case, the usefulness of a piece of lifelog data tends to be relatively high when the emotion level is relatively high. When recording data-to-be-recorded in the memory device 203, the log managing section 202 checks the available space of the memory device 203. When determining that the available space of the memory device 203 is less than a predetermined value, that is, when determining that there is not sufficient space for storing new data, the log managing section 202 references the emotion levels and the recorded dates associated with the pieces of data-to-be-recorded stored in the memory device 203. The log managing section 202 deletes, in chronological order of the recorded time, pieces of data-to-be-recorded of which the driver's emotion level is in a deletion range (in the present embodiment, less than level 5) and that have relatively low emotion levels. After securing available space in the memory device 203, the log managing section 202 stands by until new data-to-be-recorded from the center communication device 201 is delivered.

FIG. 3 shows one example of time-series data of pieces of data-to-be-recorded, in which the pieces of lifelog data of the driver of the vehicle 100 are associated with the driver's emotion levels when the lifelog data is obtained. In the example of FIG. 3, the position coordinate (Xa1, Ya1) at each moment and the title of the piece of music played in the passenger compartment (title A) at a point in time T1, at which the ignition switch of the vehicle 100 is turned on, are recorded as a piece of lifelog data. Also, the type and the level of the driver's emotion at the point in time T1, at which the lifelog data is obtained, are recorded as "anger" and 2, respectively. In the example of FIG. 3, although the position coordinate of the vehicle 100 has changed to Xa2, Ya2 at the subsequent point in time T2, the title of the piece of music is still the title A at the point in time T2. Although the type of driver's emotion has changed to "sorrow" at the point in time T2, the driver's emotion level is still as low as 1. In the lifelog data at the points in time T1 and T2, the obtained driver's emotion level is relatively low. Thus, if any service appropriate for the situation were provided, the usefulness would be limited. Therefore, in the present embodiment, such lifelog data that is obtained when the driver's emotion level is low is excluded from ones to be recorded, so that the available space of the memory device 203 is efficiently managed.

In contrast, in the example of FIG. 3, not only the position coordinate of the vehicle 100 has changed to Xa101, Ya101 at a point in time T101, but also the title of the piece of music has changed to a title B at the point in time T101. This means that the title of music played in the passenger compartment has been changed during the period from the point in time T2 to the point in time T101. The type and level of the driver's emotion at the point in time T101, at which the lifelog data is obtained, have been changed to "pleasure" and 4, respectively. At the subsequent point in time T102, the corresponding title of the piece of music has not changed from the title B, and the type of the driver's emotion has changed to "delight" at the point in time T102. The driver's emotion level is also still as high as 5. These changes in the type and the level of the driver's emotion from the point in time T2 to the point in time T101 suggest that the combination of the traveling position and the piece of music played in the passenger compartment has a strong effect on the driver's emotion, for example, when a refreshing piece of music is played while the vehicle 100 is traveling along a coastal road. Therefore, for example, when the vehicle 100 travels the same place again, playing the same piece of music is likely to be highly useful to provide a service that has a pleasant influence to the driver's emotion. Accordingly, the configuration of the present embodiment records pieces of data-to-be-recorded that are associated with high emotion levels, so that pieces of lifelog data having a high usefulness are preferentially stored in the memory device 203.

Next, the specific procedure executed by the vehicle 100 in the lifelog recording system according to the present embodiment will be described. On condition that the ignition switch is on, the vehicle 100 repeatedly executes the process shown in FIG. 4 at a predetermined interval.

The vehicle 100 first obtains, as lifelog data, vehicle operating actions by the driver during traveling of the vehicle 100, such as information regarding the current traveling position and the title of the piece of music being played in the passenger compartment, through the lifelog data obtaining section 110 (step S10).

The vehicle 100 also obtains, through the emotion level estimating section 120, estimation results of the type and the level of the driver's emotion at the time when the lifelog data is obtained at step S10 (step S11).

Using the data-to-be-recorded generating section 130, the vehicle 100 generates data-to-be-recorded by associating the estimation results of the type and the level of the driver's emotion obtained at step S11 with the driver's lifelog data obtained at step S10 (step S12).

Figure 4:
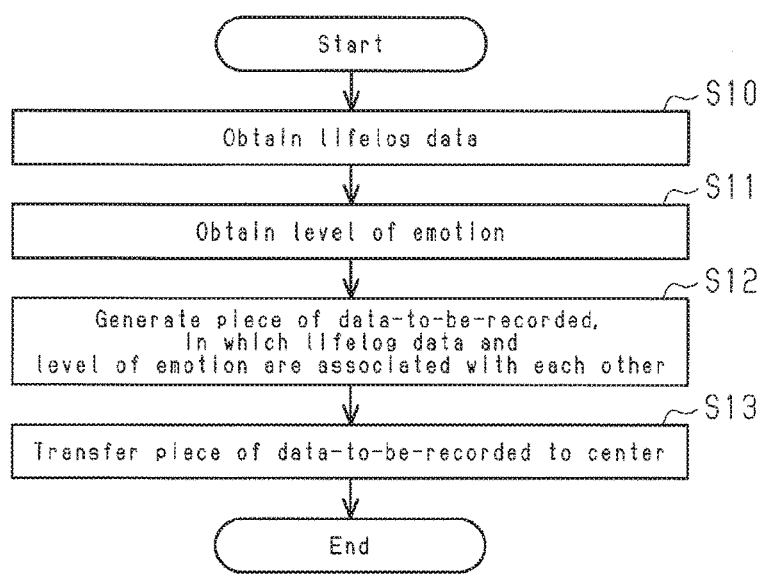
FIG. 4 is a flowchart showing a process executed by the vehicle in the lifelog recording system of FIG. 1.

Thereafter, the vehicle 100 transfers the data-to-be-recorded, which has been generated at step S12, to the center 200 via the in-vehicle communication device 150 (step S13) and then ends the process shown in FIG. 4.

Next, the specific procedure executed by the center 200 in the lifelog recording system according to the present embodiment will be described. The center 200 repeatedly executes the process shown in FIG. 5 at a predetermined interval.

Figure 5:
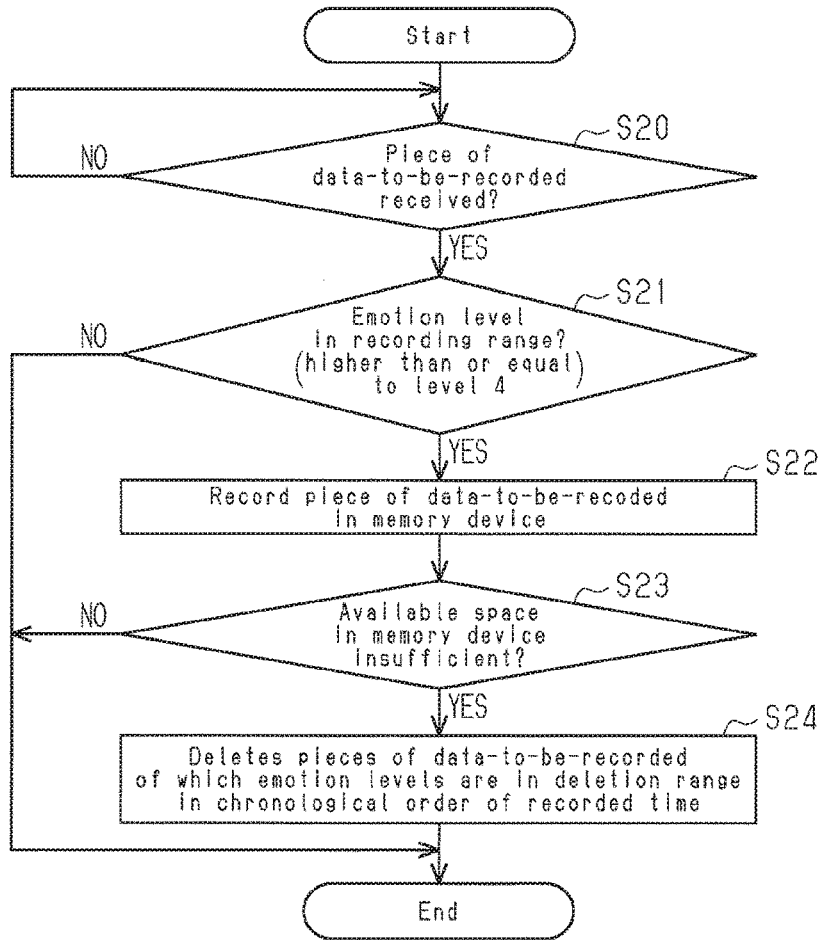
FIG. 5 is a flowchart showing a process executed by the center in the lifelog recording system of FIG. 1.

As shown in FIG. 5, the center 200 stands by until it receives a piece of data-to-be-recorded from the vehicle 100 via the center communication device 201 (step S20). When receiving a piece of data-to-be-recorded from the vehicle 100 (step S20: YES), the center 200 determines, using the log managing section 202, whether the driver's emotion level in the received piece of data-to-be-recorded is in the recording range (in the present embodiment, higher than or equal to level 4) at step S21. If the driver's emotion level in the piece of data-to-be-recorded is out of the recording range (less than level 4, step S21: NO), the center 200 discards the piece of data-to-be-recorded without recording the piece of data and ends the process of FIG. 5. In contrast, if the driver's emotion level in the piece of data-to-be-recorded is in the recording range (greater than or equal to level 4, step S21: YES), the center 200 records the piece of data-to-be-recorded in the memory device 203 (step S22).

Subsequently, the center 200 checks the available space in the memory device 203 through the log managing section 202 (step S23). When determining that the available space in the memory device 203 is less than the predetermined value and insufficient for recording new lifelog data (step S23: YES), the center 200 references the driver's emotion levels and the recorded dates in the pieces of data-to-be-recorded stored in the memory device 203 through the log managing section 202. The center 200 deletes, through the log managing section 202, pieces of data-to-be-recorded of which the driver's emotion levels are in a deletion range (in the present embodiment, less than level 5) and that have relatively low emotion levels, in chronological order (step S24). After deleting pieces of data-to-be-recorded at step S24 to secure the available space in the memory device 203, the center 200 ends the process shown in FIG. 5.

On the other hand, when determining that the available space in the memory device 203 is not insufficient for storing new data-to-be-recorded (step S23: NO), the center 200 ends the process shown in FIG. 5, without executing step S24.

Operation of the lifelog recording system of the present embodiment will now be described.

In general, associating the driver's emotion level at the time when lifelog data of the driver is obtained with the life log data effectively increases the usefulness of the lifelog data. For example, as in the example shown in FIG. 3, if the driver's emotion level at the time of obtaining the data is associated with the position coordinate of the vehicle 100 at the time and with the title of the piece of music being played in the passenger compartment, the same piece of music will be played when the vehicle 100 travels the same place. This provides a service that pleasantly influences the driver's emotion.

However, when using lifelog data highly relevant to specific types of emotion such as delight, anger, sorrow and pleasure, pieces of lifelog data having relatively high emotion levels tend to have a relatively high usefulness. Thus, in view of management of the available space of the memory device 203, it is not desirable to record and store all the pieces of data indiscriminately while disregarding the driver's emotion level, which is associated, for example, with the lifelog data.

In this regard, the present embodiment is configured to record a piece of data-to-be-recorded in the memory device 203 of the center 200 on condition that the driver's emotion level, which is associated with lifelog data, is in the recording range (higher than or equal to level 4). Therefore, highly useful pieces of lifelog data, which are obtained when the driver's emotion level is in the recording range (higher than or equal to level 4), are preferentially preserved in the memory device 203 of the center 200, so that the available space of the memory device is efficiently managed.

As described above, the above described embodiment has the following advantages.

(1) The log managing section 202 is configured to manage whether a piece of data-to-be-recorded should be stored in the memory device 203 based on the selectivity in accordance with the emotion level related to the lifelog data. This allows highly useful pieces of lifelog data to be preferentially preserved in the memory device 203, so that the available space of the memory device 203 is efficiently managed.

(2) The log managing section 202 is configured to selectively record, in the memory device 203, pieces of data-to-be-recorded of which the associated emotion level is in the recording range. Therefore, the data-to-be-recorded in the desired recording range is recorded in the memory device 203. This allows highly useful pieces of lifelog data to be automatically and preferentially preserved in the memory device.

(3) When the available space of the memory device 203 is smaller than the predetermined value, the log managing section 202 is configured to delete, from the memory device 203, pieces of data-to-be-recorded of which the associated emotion level is in the deletion range. Thus, when the available space of the memory device 203 is small, pieces of lifelog data of low usefulness are deleted preferentially. This facilitates the management of the available space of the memory device 203.

(4) When there are two or more pieces of data-to-be-recorded that are candidates to be deleted, the log managing section 202 is configured to delete the pieces of data preferentially from the piece of data of which the recorded time is older. Therefore, pieces of data are preserved that are more closely related to the present condition than in a case in which pieces of data-to-be-recorded are deleted indiscriminately based on the associated emotion levels. This permits detailed management of the log data.

(5) The log managing section 202 is configured to associate the driver's emotion level with a piece of life log data of the driver in accordance with the driver's emotion level during traveling of the vehicle 100. Therefore, the piece of music that is being played in association with a certain traveling position is obtained as a piece of lifelog data, and the emotion level at the time is assumed to be a relatively high emotion level among a number of types of emotions, such as "pleasant (happy)." When the vehicle 100 travels through the same traveling position, the same piece of music will be played automatically. That is, it is possible to preserve, in the memory device 203, lifelog data that is useful for providing timely service in accordance with the emotion of the driver of the vehicle 100.

The above described embodiment may be modified as follows.

Figure 6:
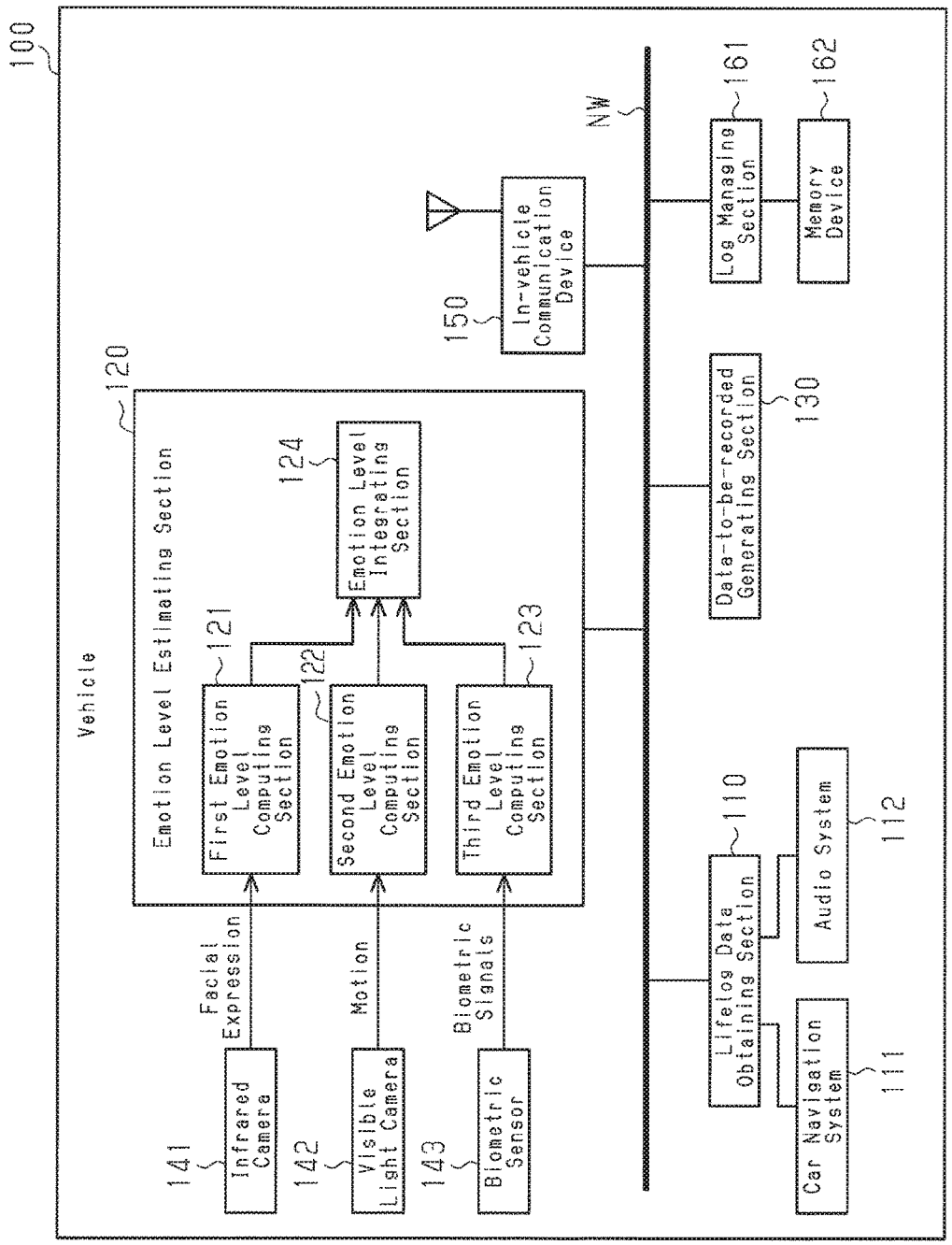
FIG. 6 is a block diagram illustrating a lifelog recording system according to a modification.

In the above illustrated embodiment, pieces of data-to-be-recorded are recorded in the memory device 203 of the center 200. Instead, as shown FIG. 6, pieces of data-to-be-recorded may be recorded in a memory device 162 of the vehicle 100 via a log managing section 161 connected to the vehicle network NW. Since the above described recording and managing methods for lifelog data allow the available space of the memory device 162 to be managed efficiently, this modification has significance.

In the above illustrated embodiment, the lifelog data obtaining section 110 obtains pieces of lifelog data of the driver of the vehicle 100 from the car navigation system 111 and the audio system 112. On the other hand, operation history of the vehicle 100 may be collected as lifelog data and employed in various assistance procedures and services. That is, as shown in FIG. 7, which is a modification of the configuration shown in FIG. 1, the lifelog data obtaining section 110 may obtain, as lifelog data, data related to the operation history, or the traveling of the vehicle, based on detection signals from an operation detecting section 113, which includes, for example, a vehicle speed sensor, an acceleration sensor, and a steering sensor. Thus, the vehicle operating actions by the driver, especially during traveling of the vehicle 100, can be widely obtained so that range of services is expected to be widened. The vehicle operating actions by the driver that are obtained as lifelog data during traveling of the vehicle 100 may vary as long as at least one of operations of the above described in-vehicle devices and operations related to the vehicle traveling is included.

In the above illustrated embodiment, the driver's emotion is estimated based on the results of monitoring the driver's actions, such as signals of images of the driver captured by the infrared camera 141 and the visible light camera 142 and the biometric signals of the driver obtained by the biometric sensor 143. However, the estimation may be made based on either the monitoring results or the biometric signals of the driver. Further, a microphone and a speech recognition section, which recognizes voice input through the microphone, may be provided. In this case, the driver's actions are monitored based on the contents of conversation made by the driver and feature quantities such as expressions in the voice such as intonations of the voice in the conversation. This increases the number of types of actions that can be used to estimate the driver's emotion level, adding to the versatility. If all the above described monitoring results including the voice are used to estimate the emotion level, the accuracy of the estimation is expected to be increased.

In the above illustrated embodiment, when there are two or more pieces of data-to-be-recorded that are candidates to be deleted, the log managing section 202 (or 161) delete the pieces of data preferentially from the piece of data of which the recorded time is older. However, if the degrees of priority of the data-to-be-recorded that are candidates to be deleted are not likely to be influenced by the time of recording, the candidates may be deleted indiscriminately.

In the above illustrated embodiment, when the available space of the memory device 203 (or 162) is smaller than the predetermined value, the log managing section 202 (or 161) deletes, from the memory device 203 (or 162), pieces of data-to-be-recorded of which the associated emotion level is relatively low. However, when using a piece of lifelog data of a steady state of the user, which is unaffected by the emotion level, the usefulness of a piece of lifelog data with a low emotion level is relatively high in some cases. In such a case, the log managing section 202 (or 161) may delete, from the memory device 203 (or 162), pieces of data-to-be-recorded of which the associated emotion level is higher than or equal to a predetermined value. Also, the log managing section 202 (or 161) may delete, from the memory device 203 (or 162), pieces of data-to-be-recorded of which the associated emotion level is in a deletion range having an upper limit and a lower limit. That is, the conditions of the emotion level used when the log managing section 202 (or 161) narrows down pieces of data-to-be-recorded that should be deleted may be changed taking into consideration the case in which the lifelog data is used.

In the above illustrated embodiment, the log managing section 202 (or 161) records, in the memory device 203 (or 162), only pieces of data-to-be-recorded of which the associated emotion level is in the recording range (the range can be changed as described above). However, this process, which is the process of S21 in FIG. 5, may be deleted, so that all the received pieces of data-to-be-recorded are recorded in the memory device 203 (or 162). That is, in this case, pieces of lifelog data to be preserved in the memory device 203 are managed only through the deletion process of step S24 in FIG. 5.

In contrast, steps S23 and S24 in FIG. 5 may be deleted so that pieces of lifelog data to be preserved in the memory device 203 are managed only through the selective recording process of step S21 in FIG. 5. In short, the lifelog data to be preserved in the memory device 203 (or 162) can be managed either through step S21 or steps S23 and S24 in FIG. 5. However, in the above illustrated embodiment, step S21 and step S24 in FIG. 5 are both executed. In this case, the emotion level with which the determination of step S21 is made positive may be defined as the "recording range," and the emotion level deleted at step S24 is defined as the "deletion range." In this case, the relationship between the "recording range" and the "deletion range" is defined such that a part of the "recording range" overlaps the "deletion range." That is, according to the above illustrated embodiment, in a case in which the emotion level is classified into level 1 to level 5, if the "recording range" is level 4 or higher and the "deletion range" is lower than 5, a piece of data at level 4, which is part of the "recording range," will be in the "deletion range." In any of the above cases, data-to-be-recorded does not necessarily need to include the "type of emotion."

In the above illustrated embodiment, the vehicle operating actions by the driver during traveling of the vehicle 100 are obtained as pieces of lifelog data, and the obtained pieces of lifelog data are associated with the driver's emotion levels to manage pieces of lifelog data to be preserved in the memory device. This method for managing lifelog data is applicable not only to the driver of the vehicle 100, but also to users of portable information terminals capable of making phone calls. In this case, the lifelog data of the user is obtained through applications or various types of sensors such as the global positioning system (GPS) incorporated in the portable information terminal. Depending on the type of the incorporated sensor or conditions, the user's emotion level may be estimated based on biometric information obtained by an appropriate wearable device, and the estimated emotion level is associated with the lifelog data. Thereafter, if whether a piece of data-to-be-recorded should be stored in the memory device is managed based on the emotion level in the method according to the above illustrated embodiment, the available space of the memory device is efficiently managed as in the manner of the above illustrated embodiment. Such a piece of lifelog data associated with an emotion level can be used to automatically notify the driver of his/her favorite shop visited in the past when the shop is near.

Not limited to the above illustrated embodiment and modifications, the present invention may be embodied as computer readable code recorded in a computer readable recording medium. The computer readable recording medium may be any data memory device that stores data that can be treated by a computer system or a microprocessor. Examples of the computer readable recording medium include a read-only memory (ROM), a random access memory (RAM), a CD-ROM, a magnetic tape, a floppy disk, and an optical data recording device. The computer readable recording medium can be distributed to two or more computers, so that the computer readable code can stored and executed in a distributed manner. The above illustrated embodiment and modifications can be described as a computer program that is transmitted via a computer readable medium. Examples of the computer readable medium include a carrier wave and a medium executed by a general or special digital computer, which executes programs.

The invention claimed is:

1. A lifelog recording system that records, as a piece of lifelog data, life information of a user, the system comprising:
    a lifelog data obtaining sensor, which is configured to obtain the piece of lifelog data from an action of the user;
    a biometric sensor configured to obtain a biometric signal;
    an Electronic Control Unit (ECU) configured to estimate an emotion level, which is a quantified emotion state of the user, based on a result of monitoring the action by the user and the biometric signal;
    a memory device, which is configured to store the piece of lifelog data,
    wherein the ECU is further configured to:
        compute probabilities of the piece of lifelog data corresponding to each of a plurality of types of emotions, based on a feature quantity of the result of monitoring and the biometric signal,
        add up the probabilities of each emotion to compute an evaluation value for each emotion used in determining the user's emotion level,
        estimate an emotion with a highest evaluation value as the user's emotion,
        generate a piece of data-to-be-recorded by associating the emotion level of the user with the piece of lifelog data,
        determine whether the piece of data-to-be-recorded should be stored in the memory device based on the associated emotion level, and
        store the piece of data-to-be-recorded in the memory device if the piece of data-to-be-recorded has an emotion level in a predefined recording range.

2. The lifelog recording system according to claim 1, wherein, when an available space of the memory device is smaller than a predetermined value, the ECU is configured to delete, from the memory device, a piece of data-to-be-recorded that has the emotion level in a deletion range.

3. The lifelog recording system according to claim 2, wherein, when there are two or more pieces of data-to-be-recorded that are candidates to be deleted, the ECU is configured to delete the pieces of data preferentially from the piece of data of which a recorded time is older.

4. The lifelog recording system according to claim 1, wherein
the user is a driver of a vehicle,
the lifelog data obtaining sensor is configured to obtain, as the piece of lifelog data, a vehicle operating action by the driver during traveling of the vehicle,
the vehicle operating action includes at least one of an operation of an in-vehicle device and an operation related to traveling of the vehicle, and
the ECU is configured to estimate the emotion level of the driver during traveling of the vehicle.

5. A lifelog recording method that is executed by a lifelog recording system comprising an Electronic Control Unit (ECU) to record, as a piece of lifelog data, life information of a user, the method comprising:
obtaining the piece of lifelog data from an action of the user;
obtaining a biometric signal from a biometric sensor;
estimating an emotion level, which is a quantified emotion state of the user, based on a result of monitoring the action by the user and the biometric signal;
storing the piece of lifelog data in a memory device;
computing probabilities of the piece of the lifelog data corresponding to each of a plurality of types of emotions based on a feature quantity of the result of monitoring and the biometric signal;
adding up the probabilities of each emotion to compute an evaluation value used in determining a user's emotion level;
estimating an emotion with the highest evaluation value as the user's emotion;
generating a piece of data-to-be-recorded by associating the estimated emotion level of the user with the obtained piece of lifelog data;
determining that the piece of data-to-be-recorded should be stored in the memory device based on the associated emotion level being in a predefined recording range; and
storing the piece of data-to-be-recorded in the memory device.

* * * * *